Oct. 4, 1966  R. M. STRICKLAND  3,276,051
SELF-OPENING THREADING TOOL HAVING ROTARY CLOSING ASSEMBLY
AND RECIPROCATING LATCH MEANS THEREFOR
Filed Oct. 15, 1964  2 Sheets-Sheet 1
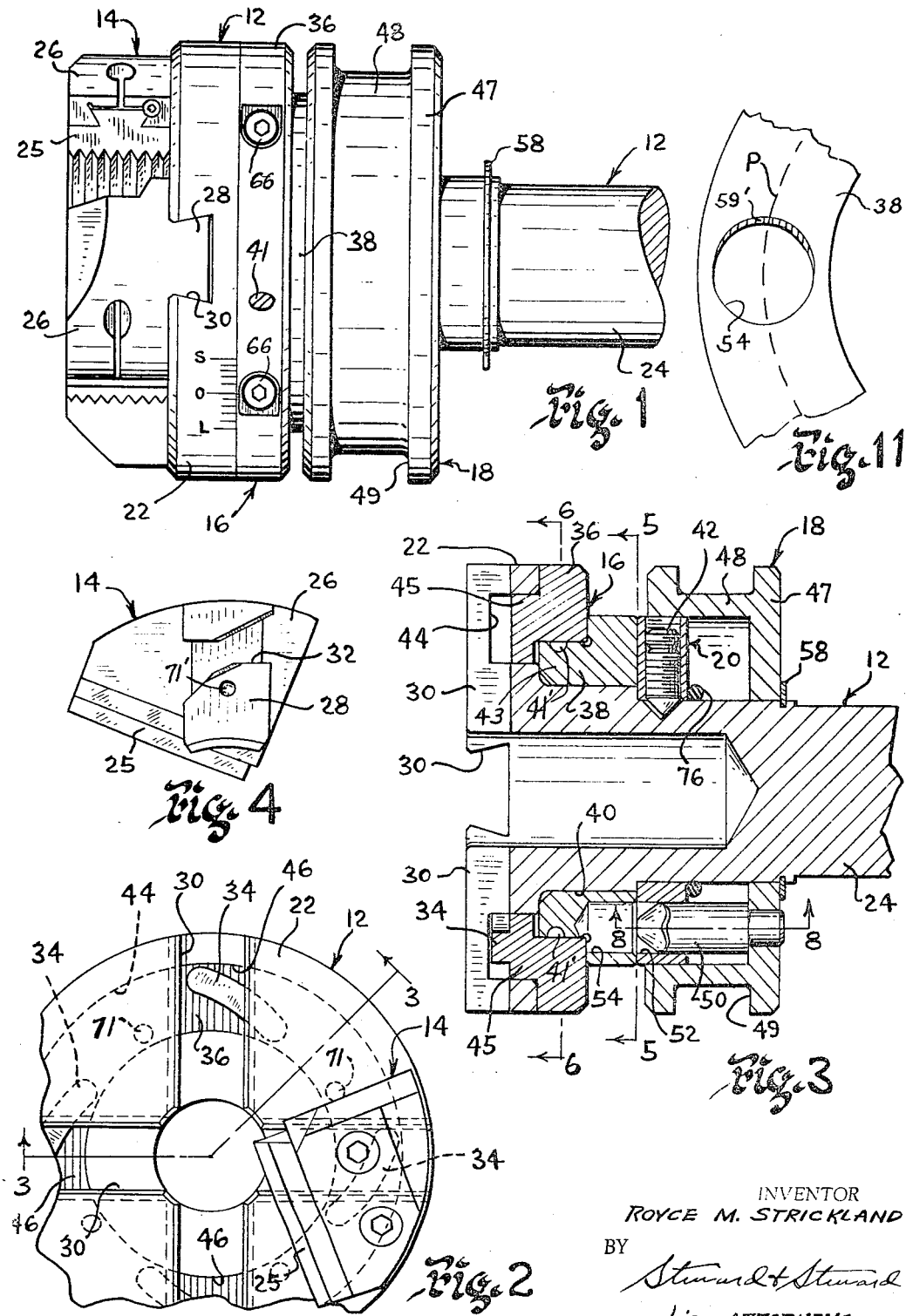
INVENTOR
ROYCE M. STRICKLAND
BY
Stewart & Stewart
his ATTORNEYS.

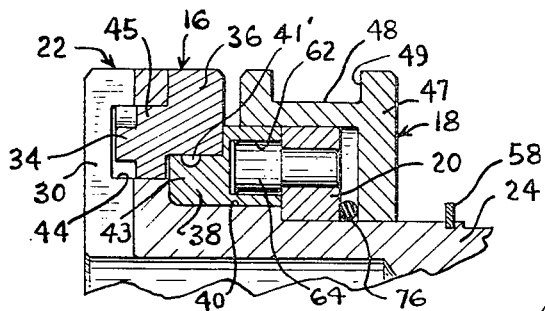
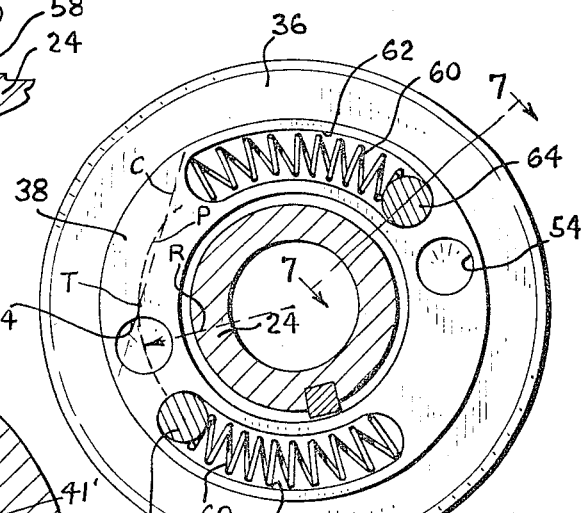
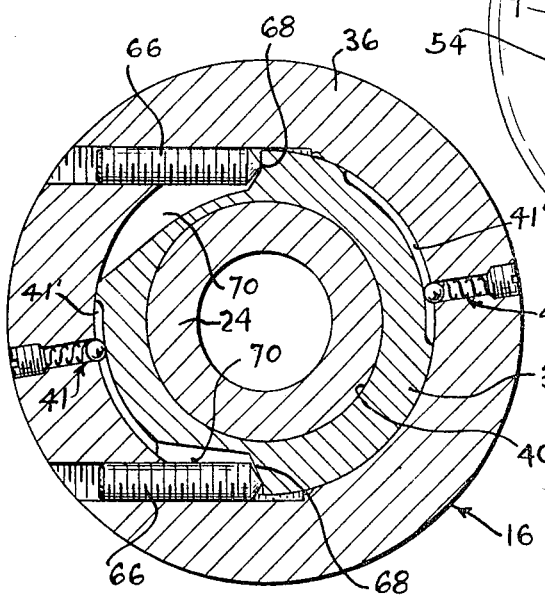
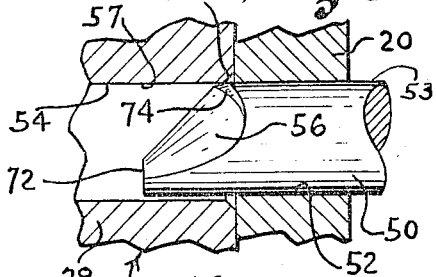
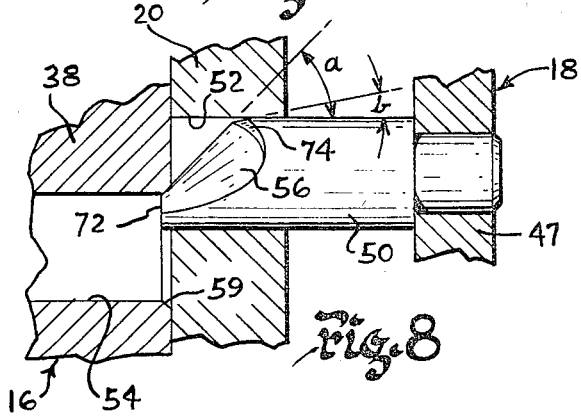
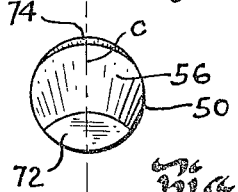
INVENTOR
ROYCE M. STRICKLAND
BY
his ATTORNEYS

United States Patent Office 3,276,051
Patented Oct. 4, 1966

3,276,051
SELF-OPENING THREADING TOOL HAVING ROTARY CLOSING ASSEMBLY AND RECIPROCATING LATCH MEANS THEREFOR
Royce M. Strickland, New Haven, Conn., assignor to United-Greenfield Corporation, Chicago, Ill., a corporation of Delaware
Filed Oct. 15, 1964, Ser. No. 404,099
14 Claims. (Cl. 10—96)

This invention relates to threading tools, such as thread-cutting die-heads and thread-rolling tools, and it relates more particularly to improvements in self-opening threading tools of the type in which the thread-forming members are brought into and out of work-engaging position by a member which is journaled on the frame of the tool for rotational movement thereon.

Threading tools used in the large-scale production and manufacture of threaded parts, such as screws and bolts, are generally provided with means for moving the thread-forming members (i.e. the chasers or threading rolls) transversely of the longitudinal axis of the workpiece so that they can be withdrawn from the workpiece upon completion of the threading operation. Various arrangements are employed to retract the thread-forming members for this purpose. In the type to which the present invention relates, a ring-shaped assembly, hereinafter referred to as a closing assembly, is journaled on the frame of the tool so that when it is turned in one direction relative to the frame, the thread-forming members are moved into work-engaging position. An operating sleeve on the tool is movable longitudinally thereof, such that movement in one direction causes the closing assembly to turn in order to move the thread-forming members into work-engaging position where they are locked in place as the threads are formed in the work. Movement of the operating sleeve in the opposite direction unlocks the thread-forming members so that they can be retracted out of engagement with the work.

A general object of the present invention is to provide a threading tool of the aforementioned type, which has a wide range of coverage from the standpoint of the size of the pieces to be threaded, permits rapid set-ups, gives trouble free operation, is easy to adjust, and is sturdy and rugged in construction.

In a prior threading tool of this type, the closing assembly is rotated on the frame of the tool by means of pins or locking bolts (usually two or three in number) mounted on the operating sleeve and having conically shaped ends which are received in recesses in the closing assembly. With the locking bolts fully engaged within such recesses, the closing assembly and thread-forming members are positively locked in work-engaging position. Upon completion of a threading operation, the operating sleeve is moved longitudinally away from the closing assembly so that the locking bolts are withdrawn from the recesses, thus permitting limited rotation of the closing assembly relative to the frame of the tool in order to retract the thread-forming members from the work.

In order to reset the thread-forming members for another threading operation, the operating sleeve is moved back in the opposite direction, causing the conical ends of the locking bolts to engage the edges of the recesses which, due to the rotation of the closing assembly in retracting the thread-forming members, are no longer in exact alignment with the locking bolts. As the locking bolts are inserted into said recesses, the conical surface on each bolt presses against one side of each recess, so that the bolts rotate the closing assembly back into its initial position. Since in thus resetting the thread-forming member, the locking bolts work against a spring pressure urging the closing assembly in the opposite direction, the camming or wedging surfaces of the locking bolts are subjected to considerable wear through repeated resetting of the tool in the high production use for which such threading tools are designed.

In prior tools the conical cam surfaces on the locking bolts provide at best only a short line-contact with the edges of the recesses, even where the edges have been chamfered in order to remove the sharp corner at the intersection of the recess with the face of the assembly in which it is formed. Consequently, all the force required to rotate the closing assembly is concentrated. In fact for all practical purposes only a point contact is made with the wedging surface, so that considerable friction is encountered, causing undesirable resistance in the operation of the tool and producing substantial wear. Furthermore, no matter how much wear occurs, it is impossible for the conical surface to make any more than a line-contact with the surface against which it works. For these reasons such conical locking bolts have been a source of trouble in the past, both from the standpoint of operation of the tool, and in the amount of wear involved.

It is therefore another object of the invention to reduce the amount of friction between the wedging surfaces in order to improve the durability and operation of the locking bolts, by which the operating sleeve rotates and locks the closing assembly in thread-engaging position.

In order to achieve these results, the wedging surfaces at the ends of the locking bolts are formed, in accordance with the present invention, so that they are generally cylindrical in shape, thereby presenting a surface of engagement which has a uniform radius approximately the same as that of the portion of the closing assembly engaged by it, so that greater contact is obtained throughout the full travel of the wedging surface. The convex wedging surface of each locking bolt mates with a concave portion formed in the closing assembly, as for example the outer corner of a cylindrical recess, into which the locking bolt fits. Furthermore, the wedging surface on the locking bolt is inclined to the direction of movement of the operating member on which it is mounted so that, upon engagement of the wedging surface with the edge of said recess, movement of the locking bolt into the recess will rotate the closing assembly enough to reset the threading members.

The amount of surface engagement of the locking bolts with the closing assembly may be increased by chamfering the edges of the recess in the closing assembly so that the locking bolts do not engage a sharp corner. The radius of curvature of the chamfered edge should be substantially the same as that of the cylindrical cam surface of the locking bolt, so that with only a small amount of wear between the engaging surfaces they will mate more perfectly. Such increased engagement of the camming surfaces makes for much smoother, more reliable and longer lasting operation of the tool than has been achieved heretofore in threading tools employing conical locking bolts.

Still another object of the invention is to provide a threading tool of the kind mentioned hereinabove, in which it is possible to adjust for pitch diameter independently of the chaser trip-mechanism, so that adjustment for size does not affect the length of the thread. A further object is to eliminate the formation of so-called "stop-lines" in the threads, especially in tapered pipe threads.

These and other objects and advantages of the invention will become more apparent from the following description of one specific embodiment of the invention as shown in the accompanying drawings, wherein;

FIG. 1 is a side elevation of a self-opening die-head in which the invention may be employed;

FIG. 2 is a partial front elevational view of the tool shown in FIG. 1, but with some of the chaser-holding assemblies removed;

FIG. 3 is a longitudinal section taken on the line 3—3 of FIG. 2;

FIG. 4 is a rear view of a chaser holder removed from the die-head;

FIGS. 5 and 6 are cross-sectional views taken on the lines 5—5 and 6—6, respectively, of FIG. 3;

FIG. 7 is a detailed sectional view taken on the line 7—7 of FIG. 5;

FIG. 8 is a detailed sectional view on a somewhat enlarged scale, taken on the line 8—8 of FIG. 3;

FIG. 9 is a view similar to FIG. 8, but showing the locking bolt in a different position;

FIG. 10 is a front end view of the locking bolt shown in FIGS. 8 and 9; and

FIG. 11 is an enlarged view of part of the rear face of the skeleton ring, showing a modification of the recess 54.

As has already been indicated hereinbefore, the present invention is applicable in threading tools generally, whether of the thread-cutting type in which chasers remove part of the material in forming the threads in the work piece, or of the thread-rolling type wherein the work is fed axially between rolls having helical threading configurations in their working surfaces such that the threads are rolled into the work without removing any material. However, for illustrative purposes, the drawings show only a thread-cutting die-head, it being apparent to those skilled in the art how the same or similar operating mechanism for opening and closing the chasers of a die-head can be employed in a thread-rolling tool to set and retract the threading rolls.

The thread-cutting die-head shown in the drawings is generally cylindrical in shape and consists of only five major parts or assemblies, namely a frame or skeleton 12, chaser and holder assemblies 14, a closing assembly 16, an operating sleeve 18, and the retaining plate 20 (FIG. 3). The skeleton 12 consists of an enlarged cylindrical flange portion or head 22 and a rearwardly extending shank 24 disposed centrally of the head 22 by which the die-head is secured in the mandrel of the threading machine. Thread-cutting chasers 25 are adjustably mounted in holders 26 in a known way, each chaser holder 26 having a dove-tail mounting tongue 28 which slides in one of the radial grooves 30 formed in the front surface of the head 22 of skeleton 12, said grooves being dove-tail shaped to correspond with tongues 28.

As shown in FIG. 4, the mounting tongue 28 on each chaser holder 26 is provided with an angularly disposed cam slot 32, into which fits one of several elongated cam lugs 34 (FIGS. 2 and 3) corresponding in number to the number of chasers employed. Cam lugs 34 project forwardly from the front face of a cam ring 36, which is one of two ring-shaped members making up the aforementioned closing assembly 16. The other member of closing assembly 16 is an inner ring 38, referred to hereinafter as the skeleton ring, which is journaled on a boss 40 forming a part of the shank of skelton 12. The two ring-shaped members 36 and 38, comprising the closing assembly 16, move in unison and are confined to rotary movement about shank 24 between the head 22 of skeleton 12 and retaining plate 20. Retaining plate 20 is keyed to shank 24 and is also rigidly locked thereon by a pair of oppositely disposed set screws 42, one of which is shown in FIG. 3. As will appear more fully hereinafter, rings 36 and 38, which are mounted coaxially, may be shifted in a circumferential direction relative to each other for adjustment purposes, but during the operation of the tool they move together as a unit.

In assembling the die-head, it has been found convenient in practice to pre-assemble the cam ring 36 and skeleton ring 38, and to this end a pair of spring detents 41 (FIG. 6) are provided in diametrically opposite sides of the outer cam ring 36. Detents 41 engage in peripheral grooves 41' on opposite sides of a stepped portion 43 (FIGS. 3 and 7) of ring 38 which telescopes within cam ring 36. Engagement of detents 41 in grooves 41' maintains the ring members 36 and 38 releasably engaged in their normal relationship with each other before and after they are assembled on skeleton 22 in order to insure correct alignment of these members.

In the rear face of the head 22 of skeleton 12 is provided an annular groove 44 centered with respect to the longitudinal axis of the tool. Groove 44 receives an annular portion 45 on the front side of cam ring 36 and is deep enough to intersect the radial grooves 30 in the opposite side of head 22 thereby forming openings 46 (FIG. 2) at the bottom of each radial groove 30, through which cam lugs 34 extend into engagement with the cam slots 32 of the chaser holders. As may be seen in FIGS. 3 and 7, cam lugs 34 are mounted on the front face of the annular portion 45 of cam ring 36. It is apparent that rotary movement of the closing assembly 16 in one direction e.g. to the left as shown in FIG. 2, causes the chaser assemblies 14 to move radially into work-engaging position, while rotary movement of assembly 16 in the opposite direction causes the chasers to retract outwardly away from the work.

Operating sleeve 18 is a cup-shaped member having a circular disk 47, which is centrally apertured to slide longitudinally on shank 24 of skeleton 12. A cylindrical wall 48 extends forwardly from adjacent the periphery of disk 47 into sliding engagement with the cylindrical outer surfaces of retaining plate 20 and skeleton ring 38, so that operating sleeve 18 is well supported for movement axially of shank 24. A circumferential groove 49 is formed in the outer surface of operating sleeve 18 for engagement by a yoke member (not shown) by which sleeve 18 is moved relative to shank 24, such yoke member being mounted on the machine with which the die-head is used. Located within operating sleeve 18 and extending parallel to the longitudinal axis of shank 24 on opposite sides thereof, is a pair of cylindrical locking bolts 50 (FIGS. 3 and 8-10), which are each rigidly fixed at one end in the disk 47 of sleeve 18. Locking bolts 50 extend forwardly through a pair of circular openings 52 in retaining plate 20 into operating relation with a pair of cylindrical recesses 54 in the rear face of skeleton ring 38 of the closing assembly 16.

As best shown in FIGS. 8 and 9, locking bolts 50 are each provided with a cam or wedging surface 56, desirably inclined at an angle $a$ of 45° to the direction of movement of bolts 50 and of operating sleeve 18 on which they are carried. When sleeve 18 is fully retracted against a stop washer 58 located in a groove in shank 24, in the position shown in FIG. 3, locking bolts 50 are fully retracted from the recesses 54 in skeleton ring 38, thus permitting the closing assembly 16 to rotate a predetermined amount about shank 24 under the urge of spring means to be described hereinafter. Upon movement of operating sleeve 18 toward the closing assembly 16, i.e. to the left as shown in the drawings, the free ends of locking bolts 50, which are supported transversely in openings 52 of retaining plate 20, move forward so that the cam surface 56 on each of the locking bolts 50 engages the outer corner 59 of each recess 54, as shown in FIG. 8. Continued movement of the operating sleeve 18 toward the closing assembly 16 causes locking bolts 50 to rotate the closing assembly 16 a predetermined distance about its central axis until bolts 50 are fully received within recesses 54, when at least a narrow band of the peripheral surface 53 (FIG. 9) of locking bolt 50 is in full engagement with the inner wall 57 of recess 54. The closing assembly 16 is thus rigidly locked by bolts 50 in working position ready to thread a workpiece in the usual manner. Upon completion of the desired threading cut, the operating sleeve 18 is moved back on shank 24 to unlock the chasers so that they can withdraw from the work.

In the particular tool here shown for illustrative purposes, the closing assembly 16 is resiliently urged in rotation in the direction for opening or retracting the chasers from the work, and to this end is spring-urged in a direction opposite that in which it is rotated by locking bolts 50 by a pair of coil springs 60 (FIG. 5) provided within arcuate grooves 62 in the rear face of skeleton ring 38. Grooves 62 are disposed concentrically of ring 38 between the diametrically opposed recesses 54 with which locking bolts 50 cooperate to rotate and lock the closing assembly, as hereinbefore described. One end of each coil spring 60 abuts an end wall of groove 62, while the other end of the spring engages one of a pair of diametrically opposed studs 64 mounted in the adjacent face of retaining plate 20. As best shown in FIG. 7, studs 64 project forwardly into operating relation with coil springs 60 in grooves 62. Since studs 64 and retaining plate 20, on which they are mounted, are fixed with respect to skeleton 12, coil springs 60 urge the closing assembly 16 in a counter-clockwise direction as viewed in FIG. 5, so that the chaser assemblies 14 are withdrawn radially away from the work into their retracted positions.

To reset the chasers for threading a workpiece, the operating sleeve 18 is again moved forward to close the die-head and latch the chasers in working position in the manner just described. In order to adjust the chasers for size within a predetermined range, the cam ring 36 may be shifted about its axis relative to skeleton ring 38, thus causing further movement of cam lugs 34 so as to shift the chaser holders a desired amount either inwardly or outwardly while in their working position. Such adjustment is accomplished by means of a pair of adjusting screws 66 (FIG. 6) in cam ring 36. Screws 66 are threaded through the wall of cam ring 36 tangentially of the cylindrical inner surface thereof, said screws being parallel to each other and disposed for engagement with a pair of shoulders 68 provided in opposite sides of the stepped portion 43 of skeleton ring 38. Shoulders 68 are formed in skeleton ring 38 by a pair of circumferentially disposed clearance grooves 70.

By backing off one adjusting screw 66 and then turning down the other, cam ring 36 and cam lugs 34 are shifted in rotation relative to skeleton ring 38. Such adjustment of cam ring 36 with respect to ring 38 in one direction will shift the chasers outwardly, whereas adjustment in the opposite direction moves the chasers together. Thus, adjustment for the desired pitch diameter of the threads to be cut may be readily made. It will also be noted that such adjustment for size does not affect the length of the thread cut because adjustment of the cam ring 36 with respect to skeleton ring 38 is completely independent of the position of operating sleeve 18 which determines whether the die-head is open or closed.

One of clearance grooves 70 in skeleton ring 38 is longer than the other in order to permit greater rotation of cam ring 36 relative to skeleton ring 38 in one direction, so that cam lugs 34 may be moved completely out of engagement with chaser holders 26 when it is desired to remove said holders from the die-head. The chaser assemblies 14 may therefore be removed from the die-head and replaced immediately with preassembled units with a minimum amount of time and effort. To do so, the die-head is first opened by moving the operating sleeve 18 back to trip the locking bolts 50 from latching engagement with recesses 54. The lower adjusting screw 66 shown in FIG. 6 is then backed off until its inner end clears the skeleton ring 38. This allows cam ring 36 to be shifted relative to ring 38 in a counterclockwise direction, as viewed in FIG. 6, or clockwise, as viewed from the front in FIG. 2, until the cam lugs 34 are clear of radial grooves 30 in the die-head so that the chaser assemblies 14 are free to be removed. The chasers may then be resharpened and replaced, as the case may be, and the assemblies remounted in the die-head by reversing the steps outlined above.

For convenience in holding the chaser assemblies 14 in proper alignment in their radial grooves 38 when cam lugs 34 are disengaged from the cam slots 32 in the back of holders 26, a spring detent 71 (FIG. 2) is provided adjacent each cam lug in the front face of cam ring 36. When cam ring 36 is turned clockwise to release chaser assembly 14 as just described, detents 71 move into registry with detent dimples 71' (FIG. 4) in the back side of the tongue 28 of each chaser holder so that the chaser assemblies do not accidentally slide out of their guide grooves 30. Detents 71, however, permit each chaser assembly to be released independently when a small amount of pressure is executed on it radially in order to overcome the spring pressure of the detent. In reassembling the chaser holders on the die-head, detents 71 again engage the dimples 71' so that the chaser assemblies 14 will be properly lined up with cam lugs 34 when the cam ring 36 is rotated back into operating position. Thus, each individual chaser assembly does not have to be held in place manually while cam lugs 34 are brought into engagement with slots 32 in chaser holders 26.

Referring again to the locking bolts 50, and especially to FIGS. 8 to 10 of the drawings, an important aspect of the present invention resides in the particular configuration of the inclined wedging surfaces 56 at the ends of bolts 50. It will be appreciated that since surfaces 56 engage the outer corners 59 of recesses 54 in order to rotate the closing assembly 16 against the pressure of coil springs 60, these surfaces are subjected to considerable pressure. It has been standard practice in prior die-heads of this type to employ conically shaped wedging surfaces on the ends of the locking bolts. Due to repeated opening and closing of the die-head in high production usage, and to the relatively great force exerted thereon by the springs for opening the die-head, substantial wear and frequent replacement of the locking bolts has been necessary. Such conical wedging surfaces used in prior construction provide only a small amount of working surface by which to move the closing member for setting the chasers in their working position, and consequently they do not contribute to the smooth operation of the tool.

In accordance with the present invention, substantially greater surface engagement is obtained between the inclined, wedging surface 56 and the closing assembly or skeleton ring 38, by employing a cam surface having a uniform radius of curvature, such as a cylinder, as opposed to the cone-shaped surface used heretofore. The axis of the cylindrical surface 56 is desirably inclined at a 45° angle to the longitudinal axis of locking bolt 50 which, as here illustrated, is parallel to the path of movement of operating sleeve 18. However this angle is not critical, and may differ depending on the particular construction and design of the die-head in which it is used. The radius of the cylindrical surface 56 may also vary in different situations but desirably corresponds to the diameter of recess 54 into which it is inserted.

Since the diameter or radius of the surface 56 is uniform throughout its length and is approximately the same as that of the corner 59 of recess 54, greater contact is obtained throughout the length of the working surface than is possible where such surface is conical, as has been the practice heretofore. Moreover, by chamfering or beveling the corner 59 at the same angle that surface 56 makes with the direction of movement of ring 38, still greater engagement may be obtained.

As mentioned hereinbefore, even the cylindrical surface 56 theoretically makes only a point contact with the corner 59 if said corner is sharp, or at best a line contact where corner 59 is chamfered. However, by using an inclined cylindrical surface, the radius of which is substantially equal to the radius of curvature at the corner 59 of recess 54, only a relatively small amount of wear will cause the engaging surfaces to mate more perfectly, and thereby to result in better surface-to-surface contact along a rather wide path near the center-line C of surface 56 (FIG. 10). Furthermore, such wear continues at a decreasing rate due to the increasing amount of bearing surface caused by such wear between the locking bolt 50 and recess 54. To a certain extent, therefore, wear between the locking bolt and closing assembly is self-correcting, in that the working surfaces continually wear toward a maximum engagement with each other. In any event, from a practical standpoint, provision of the cylindrical surface 56 results in substantially greater engagement after a short period of "wearing-in," despite the fact that the engaged surfaces may not at first be perfectly mated. Such increase in the surface contact, which the present invention assures, substantially lengthens the life of these parts. On the other hand, the conical locking bolts employed heretofore do not provide nearly as good bearing surfaces, even after considerable wear, because the curvature of the conical surface which is in contact with the edge of recess 54 continually changes from a small radius near its apex to a larger radius at the base of the cone.

The centers of recesses 54 in the skeleton ring 38 move about the central axis of the tool on an arc P having a radius R (FIG. 5). The locking bolts 50, on the other hand, are fixed against rotation with respect to shank 24 by the retaining plate 20 through which they extend. In order to ensure maximum contact between the wedging surface 56 and the chamfered surface 59 of recess 54, each locking bolt is positioned in the operating sleeve 18 so that the plane C normal to surface 56 along its center-line passes substantially tangentially of the arc P. It has been found, however, that better contact can be obtained by tilting the surface 56 about the longitudinal axis of bolt 50 so that plane C passes slightly inwardly (in a clockwise direction as viewed in FIG. 5) of a line tangent to the arc P at the point T where the longitudinal axis of bolt 50 intersects arc P. The tilting of plane C is shown somewhat exaggerated in FIG. 5 for illustrative purposes. Surface-to-surface contact can thus be obtained employing curved surfaces, even though the locking bolts are rigidly fixed in the operating sleeve 18 preventing them from pivoting about their longitudinal axes as the recesses 54 move along the arc P. Still better contact could of course be obtained by mounting the locking bolts 50 so that they can pivot enough to follow the arcuate movement of recesses 34 as the closing assembly 16 is rotated. In practice, however, it is believed to be more satisfactory to fix the bolts 50 rigidly in the operating sleeve 18.

For tools of the more common sizes, the radius R of the arc P is large enough so that the surface 56 may consist of a portion of a right-angle cylinder. In smaller tools, however, where the radius R is necessarily substantially shorter, due to the small overall diameter of the tool, the simple cylindrical surface 56 may not provide adequate bearing surface to ensure smooth operation of the parts and prevent undue wear. It may be desirable, therefore, in some instances, especially in the smaller sized tools, to form the surfaces 56 and 59 so that they mate more perfectly. As shown in FIG. 11 this may be accomplished without permitting the locking bolts 50 to pivot by forming in place of the chamfer 59 a bearing surface 59', which is more nearly cylindrical than the chamfered surface 59, and by modifying the wedging surface 56 so as to more adequately allow for the movement of the bearing surface 59' along the arc P as the closing assembly is rotated. The surface 59' may be cut or ground with a rotary tool whose axis is disposed at the same angle to the longitudinal axis of bolt 50 as that of the wedging surface on the locking bolt. The resultant crescent-shaped surface thus formed should also be centered with respect to arc P of recess 54. However, due to the fact that locking bolt 50 is fixed so that it cannot rotate about its longitudinal axis, maximum surface engagement of its wedging surface 56 is still not obtained. Perfect engagement may be had nevertheless if both surfaces 56 and 59' are generated in the same manner by a circle in a plane perpendicular to and moved along a line formed by the intersection of a cylinder containing the arc P and a diametral plane thereof disposed at the desired inclination to the plane of arc P.

It will be apparent, however, that the simple cylindrical surface 56, hereinbefore described with reference to FIGS. 8–10, is a close approximation of the compound surface in the ideal situation just mentioned. Moreover, due to the very narrow width of the chamfered surface 59, the portion thereof which is engaged by the locking bolt likewise approximates the surface 59' of the more ideal situation. From a practical standpoint, therefore, such approximations are usually sufficient in obtaining the results desired, namely the smooth operating wedging action necessary to rotate the closing assembly 16 with a minimum amount of wear at the bearing surfaces. Consequently, even where the simple cylindrical surface 56 and a chamfered surface 59 are employed, the actual bearing portions of these surfaces wear in such a way as to continually approach the ideal full-surface contact desired. Should such parts wear to the extent that the full-surface contact is reached, friction is then reduced to a minimum, so that smooth operation with virtually no additional wear can be expected to continue almost indefinitely.

It should accordingly be noted that, so long as the radius of curvature at any point along the longitudinal axis of the wedging surface on each locking bolt is uniform and substantially equal to that of the surface engaged by it, the present invention encompasses not only the practical approach to the problem wherein a simple cylindrical wedging surface is employed, but also the more ideal situation in which the wedging surface is precision formed to ensure full surface contact, as well as the arrangement in which the locking bolts are mounted so that they can pivot with the closing assemblies.

Another advantage of the wedging surface of the present invention is that the leading edge of this surface may be located near the opposite side of the locking bolt, so that maximum rotation of the closing assembly can be obtained for a locking bolt of any given diameter. Thus, the wedging surface 56 extends well across the central longitudinal axis of locking bolt 50 to its tip 72 near the underside thereof as viewed in FIGS. 8–10. A greater amount of movement can therefore be imparted to the skeleton ring 38 of closing assembly 16. Despite the proximity, however, of the leading edge of surface 56 to the lower side of locking bolt 50, a fairly massive nose portion 72 at the tip of locking bolt (see FIG. 10) is formed. Consequently the portion 72 is sufficiently strong to withstand the substantial pressures exerted upon it when the locking bolt first engages the skeleton ring 38.

In some types of threading operations more particularly for tapered pipe threads, it is desirable to prevent the formation of so-called "stop-lines" which may occur in the threads due to the sudden removal of the cutting edges of the chasers from the work. Where this factor is an important consideration, the die-head may be furnished with special locking bolts 50, in which an intermediate surface 74 is formed at the intersection of the wedging surface 56 with the adjacent cylindrical portions 53 of the locking bolt. Surface 74, hereinafter referred to as a "let-off" surface, is disposed at a much shallower angle $b$ to the longitudinal axis of locking bolt 50 than that of the surface 56. Like surface 56, the let-off surface 74 may also be cylindrically shaped and has the same radius of curvature. The purpose of let-off surface 74 is to allow the chasers to retract slowly from the work upon completion of the threading cut, so as to avoid the formation of undesired "stop-lines."

It will be apparent that when the die-head is fully closed, the locking bolts 50 extend sufficiently into recesses 54 so that neither the cam surfaces 56 nor the let-off surfaces 74 are in contact with the walls 57 or corners 59 of recesses 54, engagement being between narrow bands on the outer surfaces 53 of locking bolts 50 and the inner walls 57 of recesses 54. As the locking bolts 50 are withdrawn in order to trip the die-head, the let-off surfaces 74 thereof first come into engagement with the corners 59 (FIG. 9), permitting the closing assembly 16 to rotate back very slightly until the cam surfaces 56 contact corners 59. The closing assembly 16 then snaps back smartly into its open position, driving bolts 50 out of recesses 54. However, due to the shallowness of angle $b$ of let-off surfaces 74, engagement of these surfaces by the corners 59 of recesses 54 does not drive bolts 50 out of locking relationship. The slight counter-rotation of closing assembly 16 permitted by let-off surfaces 74 causes the chasers to be lifted comparatively slowly at first from their initial cutting position much the same way that the chasers are withdrawn in the so-called full-taper type of die-head, such as that shown in the patent to Breitenstein 2,195,837. In the present arrangement, however, the chasers are withdrawn in this manner only at the very end of the threading cut so that the cutting teeth of the chasers simply follow along the taper of the thread as the work moves axially into the die-head, thereby clearing the threads of the objectionable shoulders or stop-lines which are left when the chasers are suddenly retracted.

The angle of the let-off surfaces 74 is therefore determined by the rate at which the chasers must be withdrawn from the work in order only to complete the cut being made without increasing the length of the thread as the work continues to move axially into the die-head. Thus, the length of the let-off surface 74 along the center-line C must be sufficient to allow time for the work or the die-head, as the case may be, to make at least one full revolution, while the angle of the let-off surface, as in the case of the conical latching stud of the full-taper die-head of the above-mentioned patent to Breitenstein, depends on the taper of the thread being cut and on the rate at which the chasers are retracted by the closing assembly.

By way of a specific example, a die-head employing the present invention and designed to thread workpieces with diameters as large as ⅞ of an inch for both straight threads and jam-cut taper threads, may have an outside diameter of 3⅞ inches, with locking bolts 50 which are 7/16 of an inch in diameter and approximately 1 inch in length. The wedging surface 56 is disposed so that the angle $a$ (FIG. 8) between the center-line C and the longitudinal axis of locking bolt 50 is equal to 45°. The corresponding angle $b$ of the let-off surface 74 is 6° for jam-cutting threads with tapers of ¾ of an inch in 12 inches.

The radius of curvature of both surfaces 56 and 74 on locking bolts 50 is desirably 7/32 of an inch, and the inside diameter of the recesses 54 is ground slightly larger than the outside diameter of the locking bolts 50, so that bolts 50 fit smoothly but snugly into recesses 54. Wedging surface 56 may be as much as 0.417 inch in length along its center-line which lies in the plane C (FIG. 10), leaving a vertical dimension of about 9/64 of an inch at the center of end 72 of the locking bolt. The corner 59 of recess 54 is chamfered at a 45° angle to match the angle $a$ of wedging surface 56. In this instance the width of the chamfered surface 59 is 1/32 of an inch. It has also been found that in the example here given, a let-off surface 74, having a maximum width at its center of about 1/16 of an inch, satisfactorily eliminates stop-lines in the work. It will of course be understood that the foregoing dimensions are purely illustrative and that various other dimensions, sizes and arrangements may be employed within the scope of the claims hereinafter.

Elimination of stop-lines in the thread can also be accomplished by providing a let-off surface in the skeleton ring 38, instead of on the locking bolts 50. Thus, a gradually inclined surface may be formed just inwardly of, or in place of, the beveled edge 59 at the opening of recesses 54. It goes without saying, moreover, that let-off surfaces may also be provided on both the locking bolt and the skeleton ring, if desired, in which case they should be disposed parallel to each other. Such modifications are intended to come within the scope of the present invention as defined in the claims hereinafter.

In the design and construction of threading tools of the self-opening type, it is important to provide some means for compensating for overtravel of the operating member, e.g. operating sleeve 18, by the automatic lathe or threading machine, on which the tool is mounted. In the present tool a resilient O-ring 76 of suitable cross-section, and having an inside diameter the same as that of shank 24 in the area where operating sleeve 18 is located, is placed between the rear face of retaining plate 20 and the inner or front face of disk 47 of operating sleeve 18. When the operating sleeve 18 is moved forward in order to close the chasers, the locking bolts 50 rotate the closing assembly 16, as hereinbefore described, and lock it in place upon engagement of the latching portions of bolts 50 with the corresponding portions of recesses 54. At this point, the disk 47 of the operating sleeve 18 engages O-ring 76, as shown in FIG. 7. Since O-ring 76 is resilient, it may be compressed in order to permit additional forward travel of the operating sleeve without damage to the tool. This is important because in practice the mechanism on the threading machine may very well carry the operating sleeve somewhat beyond the point at which the die-head is fully closed and, if the operating sleeve were to come up against a rigid stop, either the threading machine or some part of the die-head would be damaged. The resilient O-ring 76, therefore, provides an extremely simple and satisfactory means of safely allowing for such overtravel.

What is claimed is:

1. In a threading tool comprising a skeleton or frame, a plurality of thread-forming members mounted on said skeleton for reciprocal movement into and out of work-engaging position, a closing assembly mounted on said skeleton for limited rotary movement thereon, actuating means associated with said closing assembly for moving said thread-forming members into work-engaging position upon rotary movement of said closing assembly relative to said skeleton, an operating sleeve mounted on said skeleton for rectilinear movement thereon toward and away from said closing assembly, and means interconnecting said operating sleeve and closing assembly such that rectilinear movement of said operating sleeve causes rotation of said closing assembly; the improvement in said means interconnecting said operating sleeve and closing assembly comprising in combination (a) at least one locking bolt mounted on said operating sleeve and having a free end disposed in the direction of movement of said operating sleeve toward said closing assembly, (b) a recess in said closing assembly so disposed as to receive the free end of said locking bolt, (c) portions of said locking bolt and of said recess being disposed for camming engagement with each other upon movement of said operating sleeve toward said closing assembly, (d) such engagement portions comprising a wedging surface adjacent the free end of said locking bolt and a wall portion of said recess, (e) said wall portion being of generally circular concave configuration, and (f) said wedging surface having a convex, substantially cylindrical configuration the central axis of which is inclined with respect to the path of movement of said operating sleeve, the radius of curvature of said wedging surface being substantially the same as that of said wall portion.

2. The combination defined in claim 1, wherein said wedging surface comprises a portion of a right-angle cylinder disposed such that a plane through the centerline of said wedging surface and normal thereto is substantially tangent to the arcuate path of said recess along which said recess moves with said closing assembly.

3. The combination defined in claim 2, wherein the walls of said recess and the periphery of said locking bolt adjacent said wedging surface are both cylindrical and of substantially the same diameter, the longitudinal axis of said locking bolt being parallel to the path of movement of said operating sleeve, said cylindrical wedging surface having a radius substantially equal to that of said recess.

4. The combination defined in claim 3, wherein the outer edge of said recess is chamfered at the same angle to the longitudinal axis of said recess as the angle which said cylindrical wedging surface makes with the longitudinal axis of said locking bolt, said engagement portion of said recess comprising a section of said chamfered edge on said arcuate path along which said recess moves.

5. The combination defined in claim 3, wherein said engagement portion of said recess comprises a crescent-shaped surface at the outer edge thereof where said wedging surface of said locking bolt contacts the wall portion of said recess, said crescent-shaped surface being cylindrical and concentric with said cylindrical wedging surface.

6. The combination defined in claim 1, which further includes a let-off surface on one of said engagement portions disposed at a substantially smaller angle to the direction of movement of said operating sleeve than said wedging surface, said let-off surface being located so as to be engaged by the other of said engagement portions upon movement of said wedging surface out of contact with the engagement portion of said closing assembly as said thread-forming members are moved into work-engaging position.

7. The combination defined in claim 6, wherein said let-off surface is disposed on said locking bolt intermediate said wedging surface and the periphery of said locking bolt adjacent thereto.

8. A threading tool comprising in combination (a) a frame assembly having a plurality of thread-forming members mounted thereon for reciprocal movement into and out of work-engaging position, (b) a closing assembly mounted on said frame assembly for limited rotary movement into and out of latching position, said closing assembly including an actuating-ring member and a latching-ring member, each forming a complete annulus and having a common central axis, said actuating-ring member being adjustably rotatable relative to said latching-ring member, (c) actuating means associated with said actuating-ring member for moving said thread-forming members into work-engaging position upon rotary movement of said closing assembly into said latching position, (d) means for rotating said closing assembly into latching position, (e) a plurality of locking bolts for locking said closing assembly in said latching position, (f) means for mounting said locking bolts with respect to said frame assembly against rotary movement about the central axis of said ring members, said locking bolts and closing assembly being mounted on said frame assembly for relative movement with respect to each other axially of said ring members, said locking bolts being disposed at equal intervals about said central axis for locking engagement with said latching-ring member, and (g) means for adjustably rotating and for fixing said actuating-ring member with respect to said latching-ring member.

9. A thread forming tool comprising in combination (a) a frame assembly having a plurality of thread-forming members mounted thereon for reciprocal movement into and out of work-engaging position, (b) a closing assembly comprising a pair of coaxial relatively rotatable ring members mounted on said frame assembly for limited rotary movement into and out of latching position, (c) cam lugs mounted on one of said ring members for moving said thread-forming members into work-engaging position upon rotary movement of said closing assembly into said latching position, (d) a sleeve member mounted on said frame assembly for rectilinear movement thereon toward and away from said closing assembly, (e) at least one locking bolt mounted on said sleeve member and having a free end disposed in the direction of movement thereof toward said closing assembly, said closing assembly having a recess to receive the free end of said locking bolt, (f) said locking bolt having adjacent its free end an inclined wedging surface disposed for engagement with a wall portion of said recess such that rectilinear movement of said sleeve member toward said closing assembly causes rotation of said closing assembly, and (g) screw means disposed between said ring members for adjustably rotating said one ring member with respect to the other, whereby said thread-forming means may be adjusted independently of said operating means within the range of rotary adjustment of said ring members relative to each other.

10. A threading tool as defined in claim 9, wherein said recess is provided in the other ring member of said closing assembly.

11. A threading tool as defined in claim 10, wherein said frame assembly includes an enlarged head and a shank rigid therewith, said closing assembly being mounted on said shank, a retaining plate rigidly fixed on said shank with said closing assembly confined between it and said head, said sleeve member being mounted on said shank on the opposite side of said retaining plate with respect to said closing assembly, and said locking bolt extending through said retaining plate into operating relation with said closing assembly.

12. A threading tool as defined in claim 11, wherein said retaining plate is provided with an aperture through which said locking bolt fits such that the free end of said locking bolt is supported transversely by said retaining plate.

13. A threading tool as defined in claim 11, wherein the peripheries of said retaining plate and closing assembly are cylindrical, and said sleeve member has a cylindrical wall extending from its periphery axially of said shank into bearing engagement with the peripheries of said retaining plate and closing assembly, whereby said sleeve member is supported by said retaining plate and closing assembly as well as by said shank.

14. In a self-opening threading tool comprising a skeleton or frame having an elongated shank, a plurality of thread-forming members mounted on said skeleton for reciprocal movement into and out of work-engaging position, an operating sleeve supported on said skeleton for movement longitudinally of said shank in one direction in order to move said thread-forming members into work-engaging position and a member fixed longitudinally of said shank for limiting the movement of said operating sleeve in said one direction, the improvement for permitting over-travel of said operating sleeve when actuated to move said thread-forming members into work-engaging position comprising in combination with said operating sleeve, skeleton and fixed member, an O-ring made of tough resilient material disposed about said shank between said operating sleeve and said fixed member such that movement of said operating sleeve in said one direction is resiliently arrested by engagement thereof with said O-ring.

References Cited by the Examiner

UNITED STATES PATENTS

| | | | |
|---|---|---|---|
| 1,396,989 | 11/1921 | Breitenstein | 10—96 |
| 1,921,754 | 8/1933 | Hyde | 10—96 |
| 2,549,543 | 4/1951 | Strickland | 10—96 |

ANDREW R. JUHASZ, *Primary Examiner.*